J. SCHACK.
RAT TRAP.
APPLICATION FILED MAR. 29, 1913.

1,194,079. Patented Aug. 8, 1916.

Witnesses:
J. W. Mayfield
T. C. Humphries

Inventor:
John Schack
By J. N. Cooke,
attorney.

UNITED STATES PATENT OFFICE.

JOHN SCHACK, OF PITTSBURGH, PENNSYLVANIA.

RAT-TRAP.

1,194,079.     Specification of Letters Patent.     Patented Aug. 8, 1916.

Application filed March 29, 1913. Serial No. 757,512.

*To all whom it may concern:*

Be it known that I, JOHN SCHACK, a citizen of Austria-Hungary, and a resident of Pittsburgh, North Side, in the county of Allegheny and State of Pennsylvania, have invented a new and useful Improvement in Rat-Traps; and I do hereby declare the following to be a full, clear, and exact description thereof.

My invention relates to rat traps and has particular reference to a type of rat trap wherein the rodent passes over a tilting platform and is precipitated into a tank filled with water.

The object of my invention is to provide a cheap, simple and efficient form of rat trap which can be easily constructed and made of any desired size, and one wherein an electric current may be used with the same, or where the trap may be used separate and apart from the electric current.

My invention consists, generally stated, in the novel arrangement, construction, and combination of parts, as hereinafter more specifically set forth and described, and particularly pointed out in the claim.

To enable others skilled in the art to which my invention appertains to construct, and use my improved rat trap, I will describe the same more fully referring to the accompanying drawing in which:—

Figure 1:
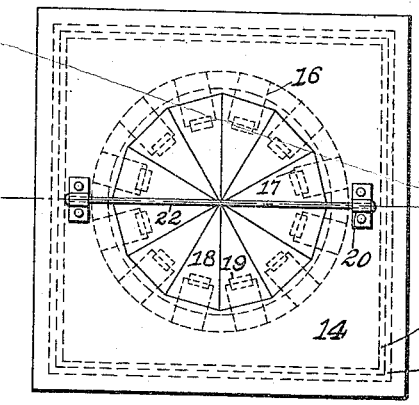
Figure 4:
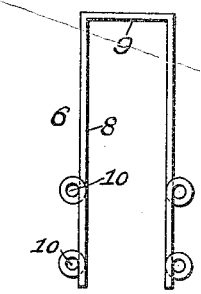
Figure 2:
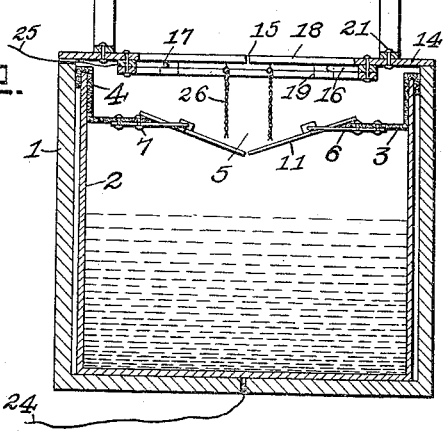
Figure 5:
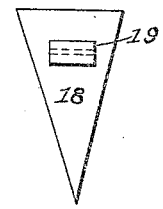
Figure 6:
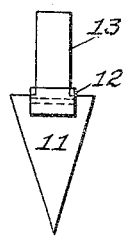
Figure 3:
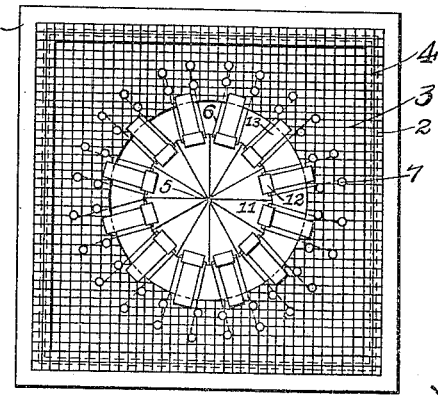

Figure 1 is a top plan view of the trap. Fig. 2 is a cross-sectional view of the same on the line 2—2 Fig. 1. Fig. 3 is a plan view of the trap with the covering removed. Figs. 4, 5 and 6 are detail parts used in the construction of the trap.

Like symbols of reference herein indicate like parts in each of the figures of the drawing.

As illustrated in the drawing, my improved rat trap is mounted in a casing 1 which is formed preferably of wood or some other non-conducting material, and is provided within the same with a copper tank 2 which is open at the top and has a partition 3 composed of wire fabric or other suitable material fastened to the edges of the same by means of the hooked portion 4 as shown in Fig. 2. The partition 3 is provided with a circular opening 5 in the center of the same, while a series of wire pivot bars 6 are attached to said partition in any suitable manner such as by rivets 7. The wire pivot bars 6 have parallel arms 8 and the end portion 9, while each of said parallel arms is provided with a pair of eyes 10 formed by twisting the wire into the proper shape and through which the rivets 7 are adapted to pass in securing the wire pivot bars 6 to the partition 3. The wire pivot bars 6 are each provided with a shutter section 11 which has a triangular shaped portion at one end of the same and is pivotally connected to said pivot bars by an attaching portion 12 on the same, and have the reduced portion 13 beyond the said triangular portion for passing between the parallel arms 8 of said wire pivot bars. When the pivot bars 6 are each provided with one of the shutter sections 11, the triangular shaped portions 12 will coincide with each other in order to form a complete covering for the opening 5 in the partition 3, and will depend slightly as shown in Fig. 2 by reason of the fact that the reduced portion 13 will rest against the edge of the partition 3 or against the rivets 7 which secure the pivot bars 6 to said partition.

The casing 1 is provided with a cover 14 for fitting over the same and such cover has an opening 15 in its center and directly above the opening 5 in the partition 3 when the cover is in position on said casing. The cover 14 is constructed of any suitable non-conducting material and has a series of pivot bars 16 secured at suitable intervals around the opening 15 and extending by their pivotal end 17 within the periphery of the opening 15. Upon each of the pivot bars 16 a triangular shaped portion 18 is adapted to operate by means of an attaching portion 19 on said triangular shaped portion engaging with the pivotal end 17 of the pivot bars 16. The shutter sections 11 and triangular shaped portions 18 are each pivotally attached to the pivot bars 6 and 16 respectively in such a manner that the rear end of the same is of just sufficient weight to hold the same in a position such as shown in Fig. 2 when no weight is placed upon the forward end of the same and within the circle of the pivot bars.

Mounted upon the cover 14 is a pair of standards 20 which are secured in any suitable manner to said cover such as by rivets 21 and such standards are provided between the same with a bar 22 which has thereon a bait securing portion 23 which is directly above the center of the openings 15 and 5 in the cover 14 and partition 3 respectively.

The use and operation of my improved rat trap is as follows:—When the rat trap is in position such as shown in Figs. 1 and 2, a suitable bait is placed upon the securing device 23 which, as stated above, is directly above the center of the openings 15 and 5 in the cover 14 and partition 3 respectively, the trap is ready for use and may be placed in any desired location where it is desired to entrap the rodents. The rodent will come upon the cover 14 in order to secure the bait on the securing device 23, and in doing so will walk upon the triangular shaped portions 18 and within the circle of securing portions 19 so that the forward ends of said triangular portions will be tilted downward and the rodent precipitated against the triangular shaped portion on the shutter section 11, which in turn will be tilted downward by the weight of the rodent so that it will be further precipitated into the tank 2 containing water, from which it will be impossible for it to escape by reason of the fact that the shutter sections 11 will return to their original position and the triangular portions 12 of the same can not be pushed upward on account of the fact that the reduced portion 13 rests against the edge of the partition 3 or the rivets 7 securing the pivot bars 6 thereto.

The cover 14 can be removed at any time in order to allow any one to look within the tank 2 through the wire fabric partition 3 to see if there are any of the rodents within the water. If so, and it is desired to remove the same, this can be done very easily by laying the hand upon the triangular portions on the shutter portions 11 and placing the other hand within the tank and thus removing the dead rodent or rodents from the same, or by removing the partition 3 and pouring the water and dead rodents from the tank 2.

If desired, the partition 3 may be omitted and the cover 14 alone used to form the tilting platform in order to precipitate the rodents into the water and tank 2.

If desired suitable electric connections can be made to the device such as the wire 24 connecting to the tank 2 and the wire 25 connecting to one of the pivot bars 16. Chains 26 are provided, one of which is connected to each of the triangular shaped portions 18.

The rodent, while passing downward through the openings 15 and 5 in the cover 14 and partition 3 respectively, will receive a shock of electric current as its body will complete the circuit between one of the chains 26 and the shutter section 11 upon which it has fallen, and thus it will either be stunned or killed before it reaches the water in the tank 2, where if not dead it will drown.

Various modifications and changes in the design, construction and operation of my improved rat trap may be resorted to without departing from the spirit of the invention or sacrificing any of its advantages.

What I claim as my invention and desire to secure by Letters Patent is:—

In a rat trap, in combination, an outer casing, a metallic vessel for insertion in said casing, a series of pivoted metallic trap-platforms carried by the upper part of said metallic vessel, a cover for said casing, a series of pivoted trap-platforms carried by said cover, contact members depending from said last named trap-platforms, and means for connecting said contacts and said metallic vessel with a source of electric current.

In testimony whereof, I, the said JOHN SCHACK, have hereunto set my hand.

JOHN SCHACK.

Witnesses:
T. B. HUMPHRIES,
W. C. COOKE.

Copies of this patent may be obtained for five cents each, by addressing the "Commissioner of Patents, Washington, D. C."